United States Patent
Kennedy et al.

(10) Patent No.: US 10,489,587 B1
(45) Date of Patent: Nov. 26, 2019

(54) SYSTEMS AND METHODS FOR CLASSIFYING FILES AS SPECIFIC TYPES OF MALWARE

(71) Applicant: Symantec Corporation, Mountain View, CA (US)

(72) Inventors: Mark Kennedy, Gardena, CA (US); Barry Laffoon, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 197 days.

(21) Appl. No.: 15/388,886

(22) Filed: Dec. 22, 2016

(51) Int. Cl.
*G06F 21/56* (2013.01)
*G06N 5/04* (2006.01)
*G06N 20/00* (2019.01)

(52) U.S. Cl.
CPC ............ *G06F 21/56* (2013.01); *G06N 5/045* (2013.01); *G06N 20/00* (2019.01); *G06F 2221/033* (2013.01)

(58) Field of Classification Search
None
See application file for complete search history.

(56) References Cited

U.S. PATENT DOCUMENTS

| 8,375,450 | B1* | 2/2013 | Oliver | G06F 21/564 726/24 |
| 2015/0379265 | A1* | 12/2015 | Lutas | G06F 21/55 726/23 |
| 2016/0253498 | A1* | 9/2016 | Valencia | G06F 21/554 726/23 |

OTHER PUBLICATIONS

Hayder Albehadili et al.; Unsupervised Decision Forest for Data Clustering and Density Estimation; https://arxiv.org/ftp/arxiv/papers/1507/1507.04060.pdf, Jul. 15, 2015.
Decision tree learning, https://en.wikipedia.org/wiki/Decision_tree_learning, last updated Oct. 30, 2016, Wikipedia, Dec. 15, 2005.
Yun Shen, et al; Systems and Methods for Identifying Malicious File Droppers; U.S. Appl. No. 15/064,633, filed Mar. 9, 2016.

* cited by examiner

*Primary Examiner* — Fatoumata Traore
(74) *Attorney, Agent, or Firm* — FisherBroyles, LLP (57) ABSTRACT

The disclosed computer-implemented method for classifying files as specific types of malware may include (i) identifying an unknown file on a computing device, (ii) performing an analysis of the unknown file by applying, to the unknown file, a machine-learning heuristic that employs at least one decision tree, (iii) classifying the unknown file as malicious based on the analysis, and (iv) after classifying the unknown file as malicious, using the same decision tree employed by the machine-learning heuristic to sub-classify the unknown file by (a) identifying at least one leaf node of the decision tree arrived at by the analysis performed by the machine-learning heuristic on the unknown file, (b) determining that the leaf node of the decision tree is associated with a particular type of malicious file, and (c) sub-classifying the unknown file as the particular type of malicious file. Various other methods, systems, and computer-readable media are also disclosed.

20 Claims, 7 Drawing Sheets

SYSTEMS AND METHODS FOR CLASSIFYING FILES AS SPECIFIC TYPES OF MALWARE

BACKGROUND

Viruses, Trojans, spyware, ransomware, and other kinds of malware are a constant threat to any computing device that requires network connectivity. Many different types of security systems exist to combat these threats, ranging from browser plug-ins, to virus scanners, to firewalls, and beyond. Countless new instances and permutations of malware are created every day, requiring security systems to be constantly updated. Despite all this, many pieces of malware still manage to infect computing devices and carry out a variety of malicious actions. Determining which type of malware a malicious file is may enable security systems to better protect computing devices from the malicious files.

Some traditional systems for classifying files as specific types of malware may rely on databases of known malware files. Such systems may be unable to correctly classify new malware that is not yet in the database. Other traditional systems may perform lengthy and computationally costly analyses on potentially malicious files, slowing down the execution of other applications on the computing device, frustrating the user, and potentially causing the user to disable the security system entirely. Some traditional systems may lose accuracy when attempting to sub-classify unknown files that have not yet been determined to be malicious or benign. The instant disclosure, therefore, identifies and addresses a need for systems and methods for classifying files as specific types of malware.

SUMMARY

As will be described in greater detail below, the instant disclosure describes various systems and methods for classifying files as specific types of malware. In one example, a computer-implemented method for classifying files as specific types of malware may include (i) identifying an unknown file on a computing device, (ii) performing an analysis of the unknown file by applying, to the unknown file, a machine-learning heuristic that employs at least one decision tree, (iii) classifying the unknown file as malicious based on the analysis by the machine-learning heuristic, and (iv) after classifying the unknown file as malicious, using the same decision tree employed by the machine-learning heuristic to sub-classify the unknown file by (a) identifying at least one leaf node of the decision tree arrived at by the analysis performed by the machine-learning heuristic on the unknown file, (b) determining that the leaf node of the decision tree is associated with a particular type of malicious file, and (c) sub-classifying the unknown file as the particular type of malicious file.

In one embodiment, the computer-implemented method may further include selecting, from a list of security actions, a particular security action that is correlated to the particular type of malicious file and performing the particular security action in response to the unknown file having been sub-classified as the particular type of malicious file. In some examples, the computer-implemented method may further include notifying a user of the computing device about the particular type of malicious file having been found on the computing device.

In some examples, using the same decision tree employed by the machine-learning heuristic to sub-classify the unknown file may include: (i) identifying a group of leaf nodes of the decision tree arrived at by the analysis performed by the machine-learning heuristic, where each leaf node is associated with one or more particular types of malicious file, (ii) determining that a predetermined percentage of the leaf nodes are associated with the particular type of malicious file, and (iii) sub-classifying the unknown file as the particular type of malicious file based on the predetermined percentage of the leaf nodes being associated with the particular type of malicious file. Additionally or alternatively, using the same decision tree employed by the machine-learning heuristic to sub-classify the unknown file may include (i) identifying a group of leaf nodes of the decision tree arrived at by the analysis performed by the machine-learning heuristic, where each leaf node includes a percentage for the particular type of malicious file, (ii) calculating a sum by adding the percentage from each leaf node, and (iii) sub-classifying the unknown file as the particular type of malicious file based on the sum of the percentages from the leaf nodes. In some examples, using the same decision tree employed by the machine-learning heuristic to sub-classify the unknown file may not include performing additional analysis of the decision tree by the machine-learning heuristic.

In one example, the computer-implemented method may further include (i) identifying a new unknown file on a computing device, (ii) performing a new analysis of the new unknown file by applying, to the new unknown file, the machine-learning heuristic that employs the decision tree, (iii) classifying the new unknown file as malicious based on the new analysis by the machine-learning heuristic, and (iv) after classifying the new unknown file as malicious, using the same decision tree employed by the machine-learning heuristic to incorrectly sub-classify the unknown file as the particular type of malicious file. In this example, the computer-implemented method may further include successfully performing a security action on the new unknown file in response to classifying the new unknown file as malicious, despite incorrectly sub-classifying the new unknown file as the particular type of malicious file.

In one embodiment, a system for implementing the above-described method may include (i) an identification module, stored in memory, that identifies an unknown file on a computing device, (ii) an analysis module, stored in memory, that performs an analysis of the unknown file by applying, to the unknown file, a machine-learning heuristic that employs at least one decision tree, (iii) a classification module, stored in memory, that classifies the unknown file as malicious based on the analysis by the machine-learning heuristic, (iv) a sub-classification module, stored in memory, that, after classifying the unknown file as malicious, uses the same decision tree employed by the machine-learning heuristic to sub-classify the unknown file by (a) identifying at least one leaf node of the decision tree arrived at by the analysis performed by the machine-learning heuristic on the unknown file, (b) determining that the leaf node of the decision tree is associated with a particular type of malicious file, and (c) sub-classifying the unknown file as the particular type of malicious file, and (v) at least one physical processor configured to execute the identification module, the analysis module, the classification module, and the sub-classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an unknown file on the computing device, (ii) perform an analysis of the unknown file by applying, to the unknown file, a machine-learning heuristic that employs at least one decision tree, (iii) classify the unknown file as malicious based on the analysis by the machine-learning heuristic, and (iv) after classifying the unknown file as malicious, use the same decision tree employed by the machine-learning heuristic to sub-classify the unknown file by (a) identifying at least one leaf node of the decision tree arrived at by the analysis performed by the machine-learning heuristic on the unknown file, (b) determining that the leaf node of the decision tree is associated with a particular type of malicious file, and (c) sub-classifying the unknown file as the particular type of malicious file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for classifying files as specific types of malware. As will be explained in greater detail below, by performing a computationally inexpensive post-analysis on decision trees used by a machine-learning heuristic to classify files, the systems and methods described herein may be able to sub-classify files as different types of malware without incurring the processing power or space costs of having additional decision trees stored and processed on client computing devices. By training the heuristic only to classify files as malicious or non-malicious and then later sub-classifying the files, the systems and methods described herein may sub-classify files with reduced risk of incorrectly classifying malicious files as non-malicious compared to systems that train heuristics to classify files as non-malicious or as any of a number of sub-classes of malware in the same classification step. In addition, the systems and methods described herein may improve the functioning of a computing device by classifying malicious files with increased precision and thus improving the computing device's ability to take appropriate action on the malicious files.

Figure 1:
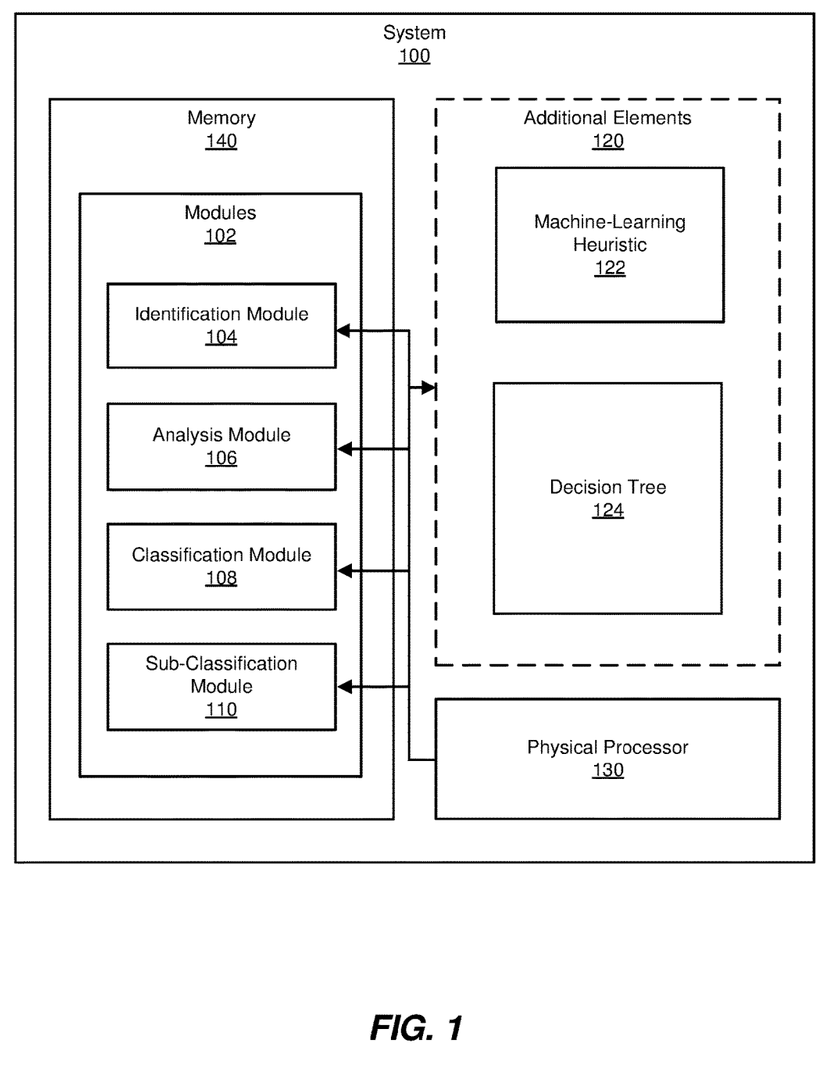
FIG. 1 is a block diagram of an example system for classifying files as specific types of malware.
Figure 2:
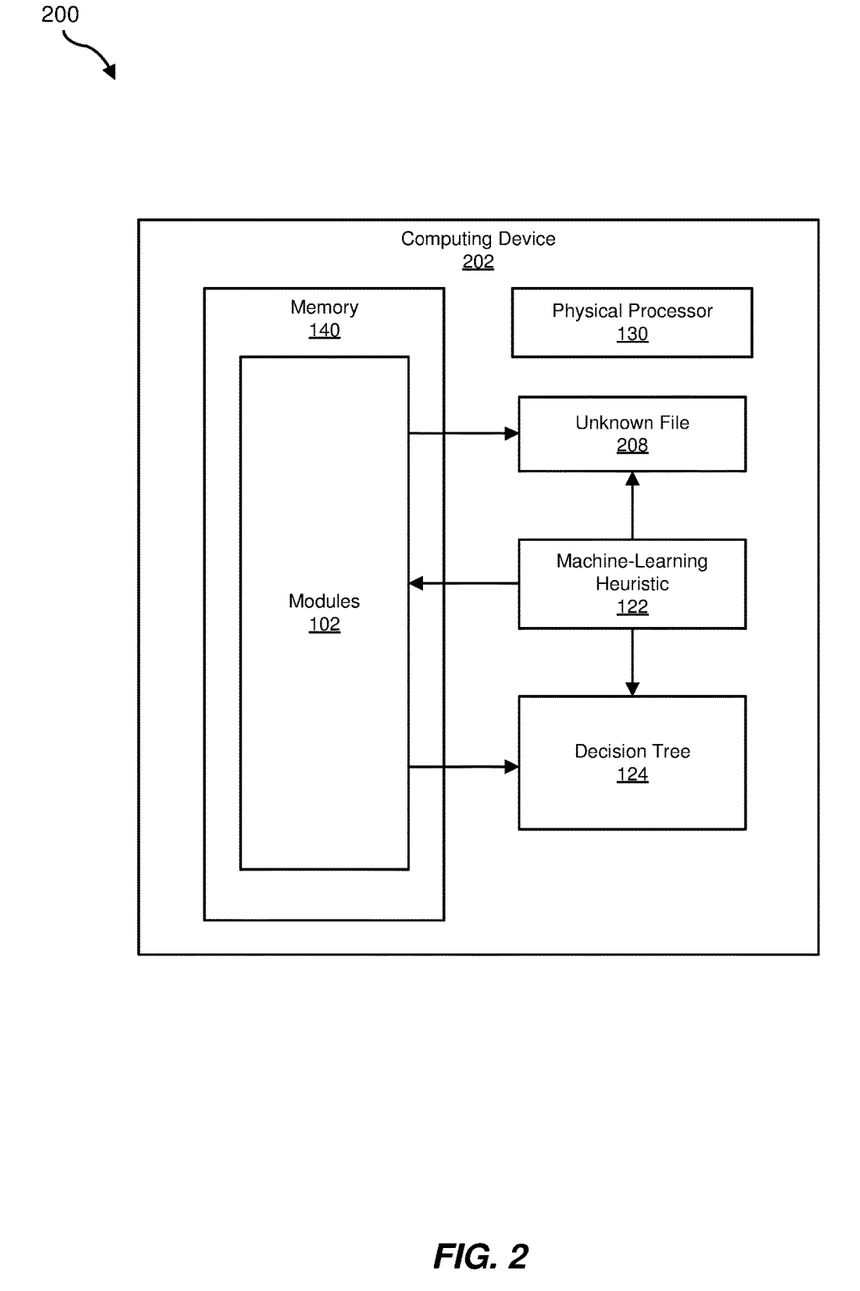
FIG. 2 is a block diagram of an additional example system for classifying files as specific types of malware.

The following will provide, with reference to FIGS. 1-2, detailed descriptions of example systems for classifying files as specific types of malware. Detailed descriptions of corresponding computer-implemented methods will also be provided in connection with FIG. 3. Detailed descriptions of example decision trees will be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of example system 100 for classifying files as specific types of malware. As illustrated in this figure, example system 100 may include one or more modules 102 for performing one or more tasks. For example, and as will be explained in greater detail below, example system 100 may include an identification module 104 that identifies an unknown file on the computing device. Example system 100 may additionally include an analysis module 106 that performs an analysis of the unknown file by applying, to the unknown file, a machine-learning heuristic that employs at least one decision tree. Example system 100 may also include a classification module 108 that classifies the unknown file as malicious based on the analysis by the machine-learning heuristic. Example system 100 may additionally include a sub-classification module 110 that, after classifying the unknown file as malicious, uses the same decision tree employed by the machine-learning heuristic to sub-classify the unknown file by (a) identifying at least one leaf node of the decision tree arrived at by the analysis performed by the machine-learning heuristic on the unknown file, (b) determining that the leaf node of the decision tree is associated with a particular type of malicious file, and (c) sub-classifying the unknown file as the particular type of malicious file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate classifying files as specific types of malware. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as machine-learning heuristic 122 and/or decision tree 124. Machine-learning heuristic 122 generally represents any type or form of machine-learning algorithm that uses one or more decision trees. Decision tree 124 generally represents any type of data that can be represented in the form of a tree.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202 enable computing device 202 to classify files as specific types of malware. For example, and as will be described in greater detail below, identification module 104 may identify an unknown file 208 on computing device 202. Next, analysis module 106 may perform an analysis of unknown file 208 by applying, to unknown file 208, machine-learning heuristic 122 that employs decision tree 124. Based on the analysis by machine-learning heuristic 122, classification module 108 may classify unknown file 208 as malicious. Sub-classification module 110 may, after classifying unknown file 208 as malicious, use the same decision tree 124 employed by machine-learning heuristic 122 to sub-classify unknown file 208 by identifying at least one leaf node of decision tree 124 arrived at by the analysis performed by machine-learning heuristic 122 on unknown file 208, determining that the leaf node of decision tree 124 is associated with a particular type of malicious file, and sub-classifying unknown file 208 as the particular type of malicious file.

Computing device 202 generally represents any type or form of computing device capable of reading computer-executable instructions. In some embodiments, computing device 202 may include a client device and/or an endpoint device, such as a personal computer. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Unknown file 208 generally represents any type or form of file, application, script, and/or module that has not yet been classified by a particular security system as malicious or non-malicious.

Figure 3:
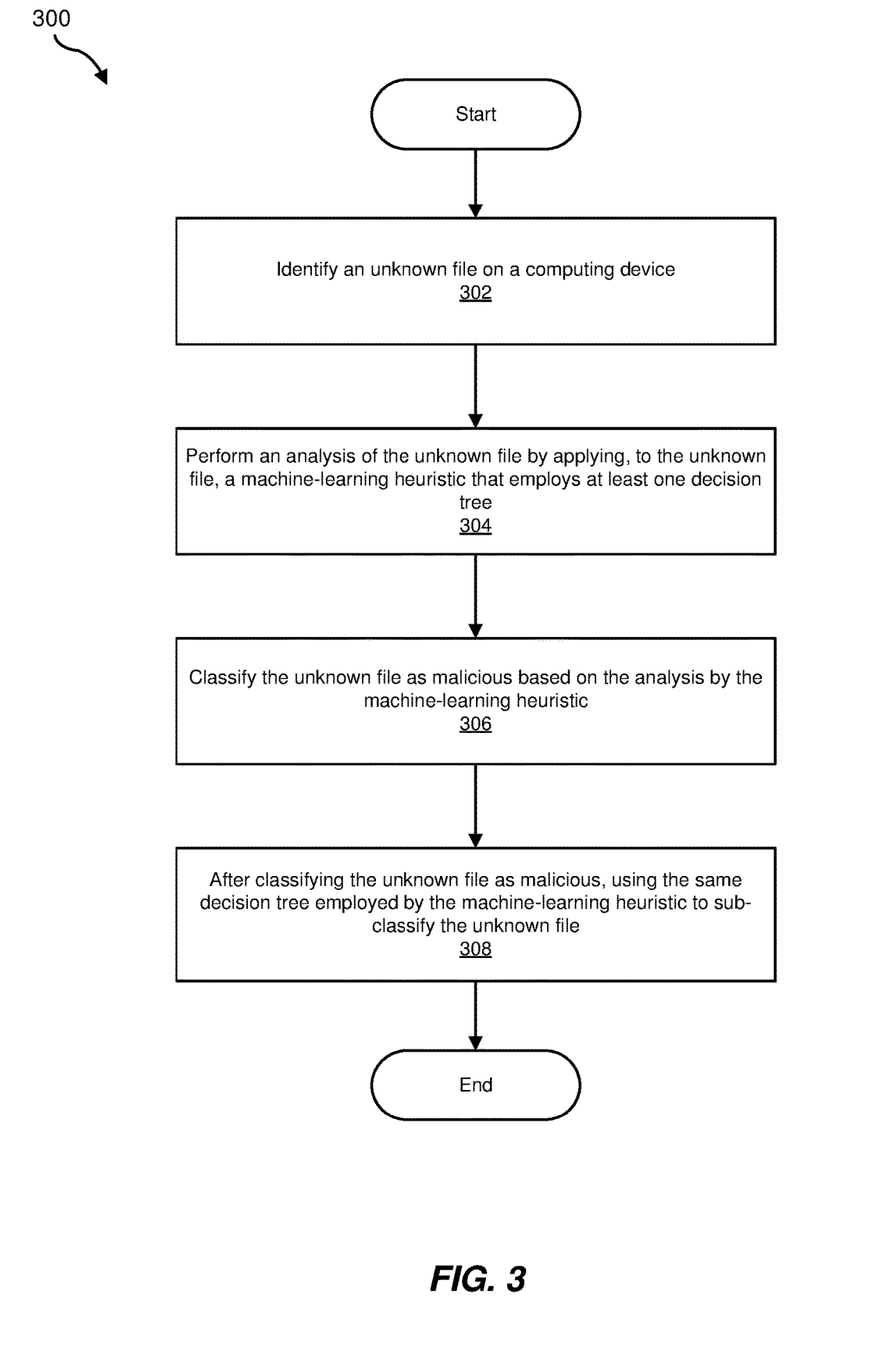
FIG. 3 is a flow diagram of an example method for classifying files as specific types of malware.

FIG. 3 is a flow diagram of an example computer-implemented method 300 for classifying files as specific types of malware. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an unknown file on the computing device. For example, identification module 104 may, as part of computing device 202 in FIG. 2, identify unknown file 208 on computing device 202.

The term "unknown file," as used herein, generally refers to any file, script, application, plug-in, and/or program on a computing device that has not previously been classified by the systems described herein as either malicious or non-malicious. In some examples, an unknown file may be a file downloaded from the Internet and/or from removable storage media. In some embodiments, an unknown file may have been classified by other security systems but may not yet have been classified by the systems described herein.

Identification module 104 may identify an unknown file in a variety of ways. For example, identification module 104 may monitor the filesystem on the computing device in order to immediately identify new files that have not yet been classified. In other embodiments, identification module 104 may periodically scan the computing device for unknown files. In some embodiments, identification module 104 may only identify suspicious files that a preliminary classification has indicated are potentially malicious. In one example, identification module 104 may be directed by an administrator of the computing device to identify the unknown file.

At step 304, one or more of the systems described herein may perform an analysis of the unknown file by applying, to the unknown file, a machine-learning heuristic that employs at least one decision tree. For example, analysis module 106 may, as part of computing device 202 in FIG. 2, perform an analysis of unknown file 208 by applying, to unknown file 208, machine-learning heuristic 122 that employs at least one decision tree 124.

The phrase "machine-learning heuristic," as used herein, generally refers to any type of computer program and/or algorithm that uses data to build predictive models. In some embodiments, a machine-learning heuristic may use and/or build one or more decision trees as part of the model. For example, a machine-learning heuristic may include a random forest algorithm, a bagging decision tree algorithm, and/or a rotation forest algorithm.

The term "decision tree," as used herein, generally refers to any method of organizing data that consists of a root node that represents a starting point, internal nodes, and leaf nodes that represent the ends of branches. In some embodiments, a decision tree may be constructed and/or used by a machine-learning heuristic in order to classify files as malicious or non-malicious.

Analysis module 106 may analyze the unknown file in a variety of ways. For example, analysis module 106 may analyze the unknown file using the decision tree and may record which leaf nodes the machine-learning heuristic arrives at when analyzing the unknown file via the decision tree.

At step 306, one or more of the systems described herein may classify the unknown file as malicious based on the analysis by the machine-learning heuristic. For example, classification module 108 may, as part of computing device 202 in FIG. 2, classify unknown file 208 as malicious based on the analysis by the machine-learning heuristic.

Classification module 108 may classify the unknown file in a variety of ways. For example, classification module 108 may classify the file as malicious based on the results of the machine-learning heuristic operating on the decision tree. In some examples, classification module 108 may classify the file as non-malicious. In these examples, sub-classification module 110 may not attempt to further sub-classify the file.

At step 308, one or more of the systems described herein may, after classifying the unknown file as malicious, use the same decision tree employed by the machine-learning heuristic to sub-classify the unknown file. For example, sub-classification module 110 may, as part of computing device 202 in FIG. 2, after classifying unknown file 208 as malicious, use the same decision tree 124 employed by machine-learning heuristic 122 to sub-classify unknown file 208 by (i) identifying at least one leaf node of decision tree 124 arrived at by the analysis performed by machine-learning heuristic 122 on unknown file 208, (ii) determining that the leaf node of decision tree 124 is associated with a particular type of malicious file, and (iii) sub-classifying unknown file 208 as the particular type of malicious file.

The term "particular type of malicious file," as used herein, generally refers to any category of malicious file and/or any descriptor of a type of behavior of malicious file. Examples of a particular type of malicious file include, without limitation, spyware, Trojans, ransomware, viruses, keyloggers, adware, and/or botnet applications.

Sub-classification module 110 may sub-classify the file in a variety of ways. For example, sub-classification module 110 may sub-classify the file as having a percentage likelihood and/or confidence level of being a particular type of malware. In another example, sub-classification module 110 sub-classify the file as likely being one of several different particular types of malware with percentage likelihoods and/or confidence levels for each type.

Figure 4:
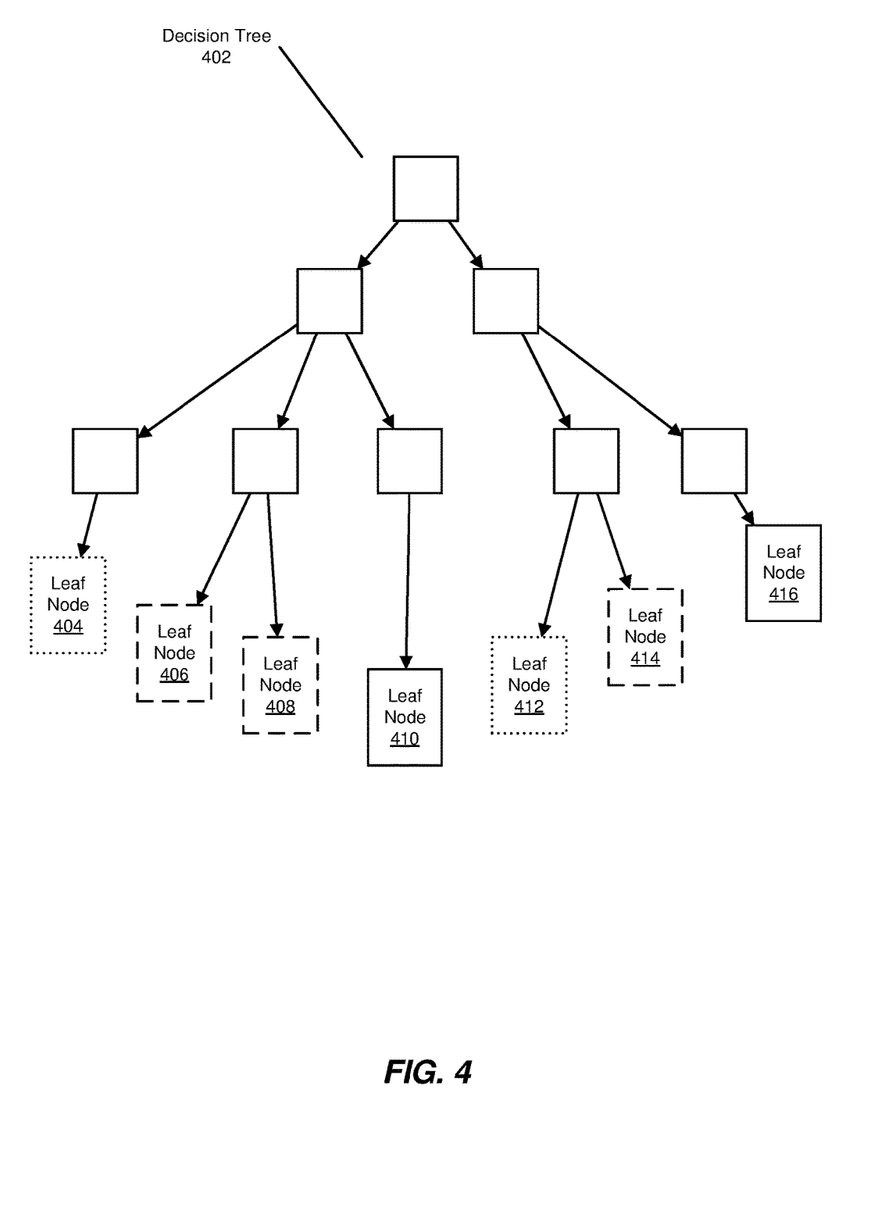
FIG. 4 is a block diagram of an example decision tree.

In some examples, sub-classification module 110 may use the same decision tree employed by the machine-learning heuristic to sub-classify the unknown file by (i) identifying a set of leaf nodes of the decision tree arrived at by the analysis performed by the machine-learning heuristic, where each leaf node is associated with one or more particular types of malicious file, (ii) determining that a predetermined percentage of the plurality of leaf nodes are associated with a particular type of malicious file, and (iii) sub-classifying the unknown file as the particular type of malicious file based on the predetermined percentage of the plurality of leaf nodes being associated with the particular type of malicious file. For example, as illustrated in FIG. 4, decision tree 402 may terminate at leaf nodes 404, 406, 408, 410, 412, 414, and/or 416. In one example, leaf nodes 410 and/or 416 may be associated with files that are not malicious, leaf nodes 406, 408, and/or 414 may be associated with ransomware, and/or leaf nodes 404 and/or 412 may be associated with adware. In one example, if the analysis performed on a file by analysis module 106 arrived at leaf nodes 406, 408, and 412, sub-classification module 110 may classify the file as ransomware because more than 50% of the leaf nodes are associated with ransomware. In another example, if an analysis performed on a file arrives at leaf nodes 404 and 412, sub-classification module 110 may classify the file as adware because over 80% of the leaf nodes are associated with adware. In some embodiments, sub-classification module 110 may sub-classify the unknown file based on the leaf nodes of multiple decision trees.

The systems and methods described herein may determine that a leaf node is associated with a particular type of malware in a variety of ways. In one embodiment, the systems and methods described herein may use other sub-classification systems to analyze the files that arrive at a leaf node and may determine that a majority and/or plurality of those files are a particular type of malware. Additionally or alternatively, the systems described herein may classify already-labelled data using the decision tree and monitor which leaf nodes the already-labelled files arrive at.

Figure 5:
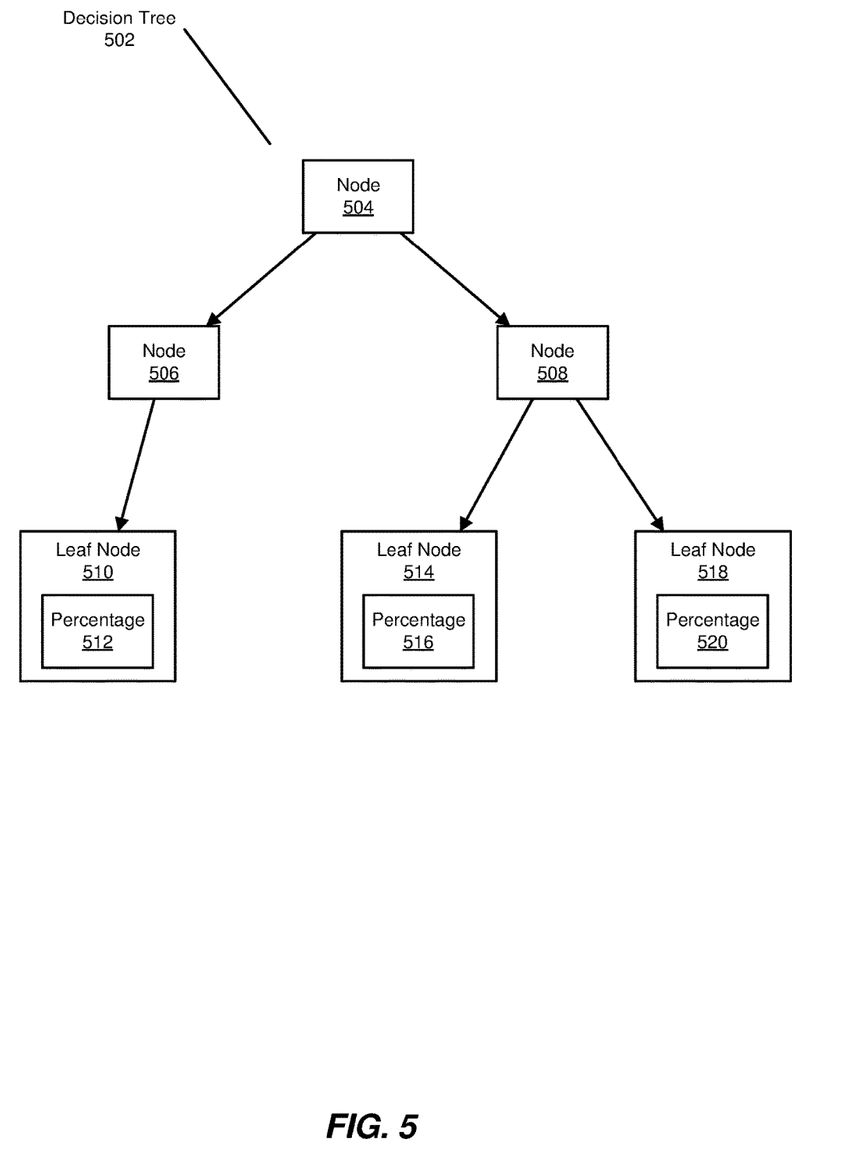
FIG. 5 is a block diagram of an example decision tree.

In some examples, sub-classification module 110 may use the same decision tree employed by the machine-learning heuristic to sub-classify the unknown file by (i) identifying a plurality of leaf nodes of the decision tree arrived at by the analysis performed by the machine-learning heuristic, where each leaf node includes a percentage for the particular type of malicious file, (ii) calculating a sum by adding the percentage from each leaf node, and (iii) sub-classifying the unknown file as the particular type of malicious file based on the sum of the percentages from the plurality of leaf nodes. For example, as illustrated in FIG. 5, decision tree 502 may include nodes 504, 506, and/or 508 as well as leaf nodes 510, 514, and/or 518. In some examples, leaf node 510 may have a percentage 512 likelihood of being a particular type of malware, leaf node 514 may have a percentage 516 likelihood of being a particular type of malware, and/or leaf node 518 may have a percentage 520 likelihood of being a particular type of malware. In one example, any unknown file that arrives at leaf node 510 may have an 80% chance of being ransomware, any unknown file that arrives at leaf node 514 may have a 60% chance of being a botnet application, and/or any unknown file that arrives at leaf node 518 may have a 40% chance of being ransomware.

Sub-classification module 110 may sub-classify an unknown file based on the percentages in a variety of ways. For example, sub-classification module 110 may calculate an average of the percentages. In one example, sub-classification module 110 may determine that a file that arrived at leaf nodes 510 and 518 may have a 60% chance of being ransomware. In another embodiment, sub-classification module 110 may compare a sum of the percentages against a predetermined number. For example, if a file arrives at leaf nodes 510 and 518, which have percentages that sum to 120%, sub-classification module 110 may compare that sum to a predetermined number of 150% and may calculate that the unknown file has an 80% chance of being ransomware.

In some embodiments, leaf nodes may have multiple associated percentages. For example, any unknown file that arrives at leaf node 510 may have an 80% chance of being ransomware, a 15% chance of being spyware, and a 5% chance of being any other type of malware that is neither ransomware nor spyware. The systems described herein may calculate percentages for leaf nodes in a variety of ways. In some embodiments, the systems described herein may use another classifier to classify the files that have arrived at various leaf nodes and may assign percentages to leaf nodes based on those files. Additionally or alternatively, the systems described herein may classify already-labelled data using the decision tree and monitor at which leaf nodes the already-labelled files arrive. In one embodiment, the systems described herein may determine that if 90% of all files that arrive at a certain leaf node are ransomware, then that leaf node is assigned a 90% probability for ransomware.

In some examples, sub-classification module 110 may use the same decision tree employed by the machine-learning heuristic to sub-classify the unknown file without performing additional analysis of the decision tree by the machine-learning heuristic. For example, performing calculations using percentages assigned to leaf nodes and/or counting the number of leaf nodes associated with each particular type of malware may be operations that are not performed by a machine-learning heuristic.

In one embodiment, the systems described herein may select, from a list of security actions, a particular security action that is correlated to the particular type of malicious file and may perform the particular security action in response to the unknown file having been sub-classified as the particular type of malicious file. For example, the systems described herein may create a backup copy of key files in response to determining that the malicious file is ransomware.

In some examples, the systems described herein may include notifying a user of the computing device about the particular type of malicious file having been found on the computing device. For example, the systems described herein may present the user with a message window and/or dialog box indicating that malware of the particular type was found. In one example, the systems described herein may inform the user that ransomware was found on their computer.

In one embodiment, the systems described herein may incorrectly sub-classify an unknown file as the particular type of malicious file but still successfully perform a security action on the file. Because the systems described herein classify a file as malicious or non-malicious independent of the sub-classification of the file, the systems described herein may still protect a computing device from a malicious file even if the sub-classification is inaccurate. For example, the systems described herein may incorrectly classify a keylogger as ransomware but may still successfully remove the keylogger, preventing the malicious file from causing harm to the computing device.

In some embodiments, the systems described herein may adjust the sensitivity of the sub-classification function. For example, if the systems described herein detect that the sub-classification function is routinely failing to sub-classify files as being part of any particular type of malicious file, the systems described herein may increase the sensitivity of the sub-classification function so that files with lower confidence levels are sub-classified as being of a particular type. If the systems described herein detect that the sub-classification function is routinely inaccurately classifying files, the systems described herein may decrease the sensitivity of the sub-classification system so that only files with a higher confidence level are sub-classified. In some embodiments, the systems described herein may enable an administrator to change the sensitivity level of the sub-classification function.

As explained in connection with method 300 above, the systems and methods described herein may sub-classify malware into families and/or categories of malware. First, the systems and methods described herein may run a large set of labelled data through a machine-learning classifier that uses multiple trees and track at which leaf nodes of the trees different types of malware arrive. In some embodiments, this process may take place before the classifier is deployed to an endpoint computing device. When an unknown file arrives on an endpoint computing device configured with the systems described herein, the systems described herein classify the file as malware or not malware by using the machine-learning heuristic. The systems described herein may then examine the leaf nodes that the file arrived at to determine which type or types of malware those leaf nodes are correlated with and may then sub-classify the file as a specific type of malware based on the leaf nodes. By performing post-analysis on the decision trees rather than using a second set of decision trees to sub-classify the file, the systems described herein may save computing resources. By using the initial machine-learning heuristic only to classify the file as malicious or benign, the systems described herein may avoid the potential loss of accuracy where very rare types of malicious files may inaccurately be categorized as benign. Thus, the systems and methods described herein may efficiently provide users with additional information about malware discovered on their computing devices without sacrificing security.

Figure 6:
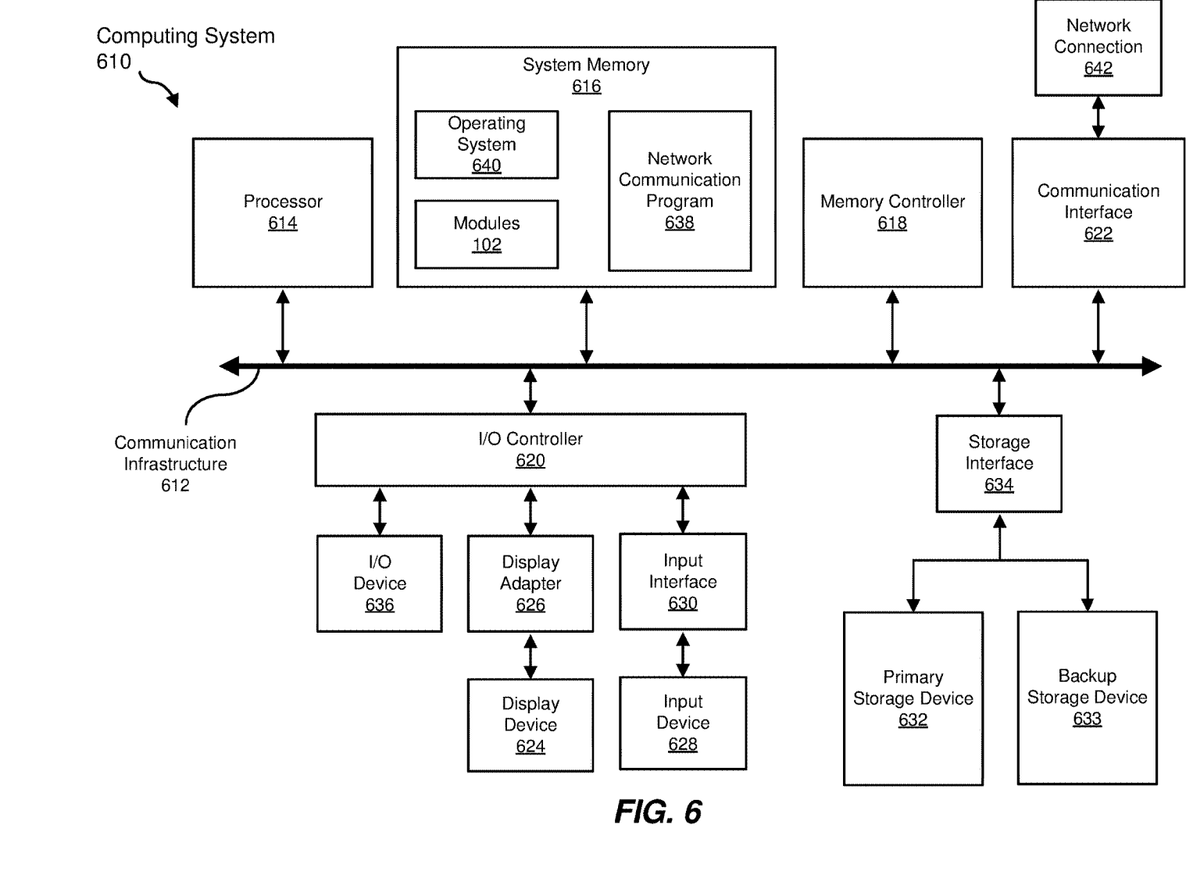
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like.

Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
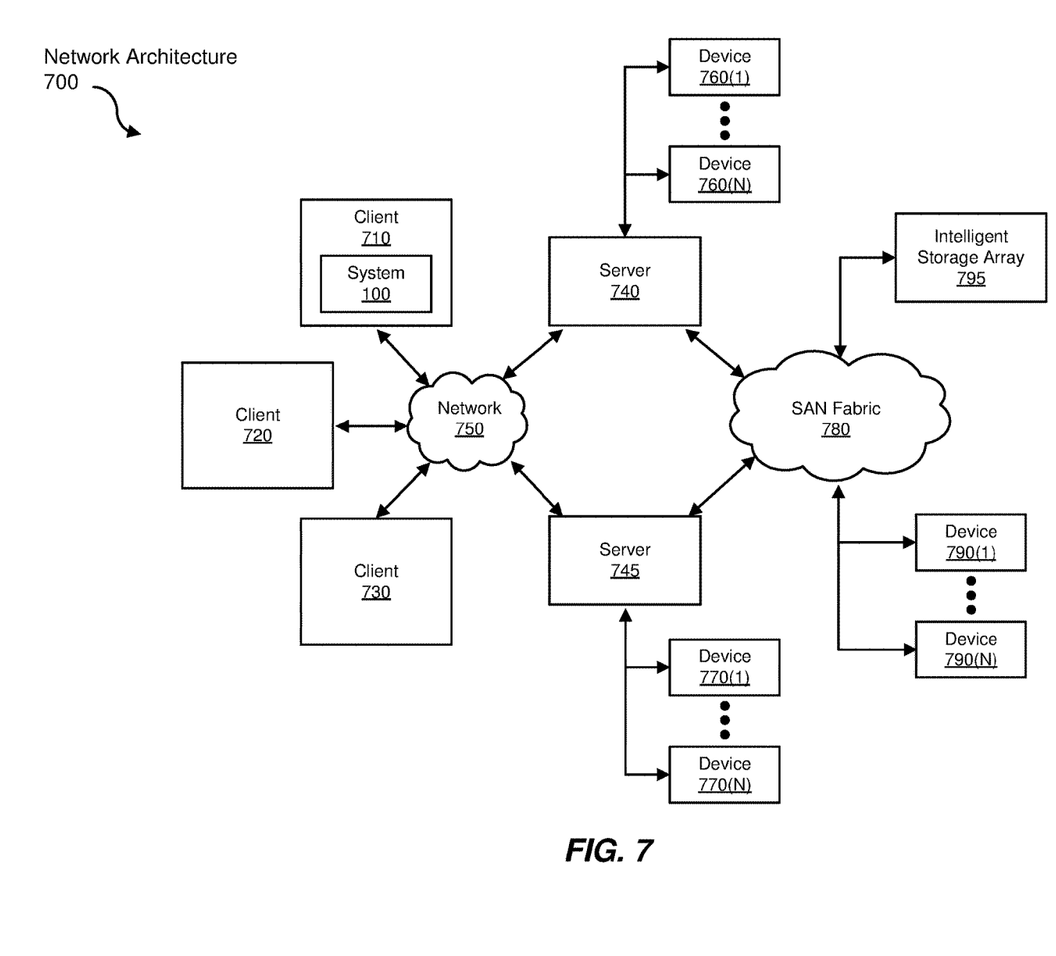
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for classifying files as specific types of malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive file data to be transformed, transform the file data by analyzing it, output a result of the transformation to a decision tree, use the result of the transformation to classify and/or sub-classify the file, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for classifying files as specific types of malware, at least a portion of the method being performed by a computing device comprising at least one processor, the method comprising:
   identifying an unknown file on the computing device;
   performing an analysis of the unknown file by applying, to the unknown file, a machine-learning heuristic that employs at least one decision tree;
   classifying the unknown file as malicious based on the analysis by the machine-learning heuristic; and
   after classifying the unknown file as malicious, using the same decision tree employed by the machine-learning heuristic to sub-classify the unknown file by:
      identifying at least one leaf node of the decision tree arrived at by the analysis performed by the machine-learning heuristic on the unknown file;
      determining that the leaf node of the decision tree is associated with a particular type of malicious file;
      sub-classifying the unknown file as not being the particular type of malicious file;
      adjusting a sensitivity of the machine-learning heuristic associated with sub-classifying files based on a confidence level, wherein adjusting the sensitivity comprises:
         determining that one or more additional files on the computing device have been inaccurately classified by the machine-learning heuristic; and
         decreasing the sensitivity of the machine-learning heuristic so that only files having a confidence level above a threshold are sub-classified by the machine-learning heuristic; and
      sub-classifying the unknown file as the particular type of malicious file in response to adjusting the sensitivity; and
   performing a security action in response to the unknown file having been sub-classified by the machine-learning heuristic as the particular type of malicious file, the security action being correlated to the particular type of malicious file and protecting the computing device from harm by removing the particular type of malicious file.

2. The computer-implemented method of claim 1, further comprising:
   selecting, from a list of security actions, the security action that is correlated to the particular type of malicious file.

3. The computer-implemented method of claim 1, further comprising notifying a user of the computing device about the particular type of malicious file having been found on the computing device.

4. The computer-implemented method of claim 1, wherein using the same decision tree employed by the machine-learning heuristic to sub-classify the unknown file comprises:
   identifying a plurality of leaf nodes of the decision tree arrived at by the analysis performed by the machine-learning heuristic, wherein each leaf node is associated with one or more particular types of malicious file;
   determining that a predetermined percentage of the plurality of leaf nodes are associated with the particular type of malicious file; and
   sub-classifying the unknown file as the particular type of malicious file based on the predetermined percentage of the plurality of leaf nodes being associated with the particular type of malicious file.

5. The computer-implemented method of claim 1, wherein using the same decision tree employed by the machine-learning heuristic to sub-classify the unknown file comprises:
   identifying a plurality of leaf nodes of the decision tree arrived at by the analysis performed by the machine-learning heuristic, wherein each leaf node comprises a percentage for the particular type of malicious file;
   calculating a sum by adding the percentage from each leaf node; and
   sub-classifying the unknown file as the particular type of malicious file based on the sum of the percentages from the plurality of leaf nodes.

6. The computer-implemented method of claim 1, wherein using the same decision tree employed by the machine-learning heuristic to sub-classify the unknown file does not comprise performing additional analysis of the decision tree by the machine-learning heuristic.

7. The computer-implemented method of claim 1, further comprising:
identifying a new unknown file on the computing device;
performing a new analysis of the new unknown file by applying, to the new unknown file, the machine-learning heuristic that employs the decision tree;
classifying the new unknown file as malicious based on the new analysis by the machine-learning heuristic;
after classifying the new unknown file as malicious, using the same decision tree employed by the machine-learning heuristic to incorrectly sub-classify the unknown file as the particular type of malicious file; and
successfully performing the security action on the new unknown file in response to classifying the new unknown file as malicious and despite incorrectly sub-classifying the new unknown file as the particular type of malicious file.

8. A system for classifying files as specific types of malware, the system comprising:
an identification module, stored in memory, that identifies an unknown file on a computing device;
an analysis module, stored in memory, that performs an analysis of the unknown file by applying, to the unknown file, a machine-learning heuristic that employs at least one decision tree;
a classification module, stored in memory, that classifies the unknown file as malicious based on the analysis by the machine-learning heuristic;
a sub-classification module, stored in memory, that, after classifying the unknown file as malicious, uses the same decision tree employed by the machine-learning heuristic to sub-classify the unknown file by:
identifying at least one leaf node of the decision tree arrived at by the analysis performed by the machine-learning heuristic on the unknown file;
determining that the leaf node of the decision tree is associated with a particular type of malicious file;
sub-classifying the unknown file as not being the particular type of malicious file;
adjusting a sensitivity of the machine-learning heuristic associated with sub-classifying files based on a confidence level, wherein adjusting the sensitivity comprises:
determining that one or more additional files on the computing device have been inaccurately classified by the machine-learning heuristic; and
decreasing the sensitivity of the machine-learning heuristic so that only files having a confidence level above a threshold are sub-classified by the machine-learning heuristic; and
sub-classifying the unknown file as the particular type of malicious file in response to adjusting the sensitivity; and
performing a security action in response to the unknown file having been sub-classified by the machine-learning heuristic as the particular type of malicious file, the security action being correlated to the particular type of malicious file and protecting the computing device from harm by removing the particular type of malicious file; and
at least one physical processor configured to execute the identification module, the analysis module, the classification module, and the sub-classification module.

9. The system of claim 8, wherein the sub-classification module:
selects, from a list of security actions, the security action that is correlated to the particular type of malicious file.

10. The system of claim 8, wherein the sub-classification module notifies a user of the computing device about the particular type of malicious file having been found on the computing device.

11. The system of claim 8, wherein the sub-classification module uses the same decision tree employed by the machine-learning heuristic to sub-classify the unknown file by:
identifying a plurality of leaf nodes of the decision tree arrived at by the analysis performed by the machine-learning heuristic, wherein each leaf node is associated with one or more particular types of malicious file;
determining that a predetermined percentage of the plurality of leaf nodes are associated with the particular type of malicious file; and
sub-classifying the unknown file as the particular type of malicious file based on the predetermined percentage of the plurality of leaf nodes being associated with the particular type of malicious file.

12. The system of claim 8, wherein the sub-classification module uses the same decision tree employed by the machine-learning heuristic to sub-classify the unknown file by:
identifying a plurality of leaf nodes of the decision tree arrived at by the analysis performed by the machine-learning heuristic, wherein each leaf node comprises a percentage for the particular type of malicious file;
calculating a sum by adding the percentage from each leaf node; and
sub-classifying the unknown file as the particular type of malicious file based on the sum of the percentages from the plurality of leaf nodes.

13. The system of claim 8, wherein the sub-classification module using the same decision tree employed by the machine-learning heuristic to sub-classify the unknown file does not comprise performing additional analysis of the decision tree by the machine-learning heuristic.

14. The system of claim 8, wherein:
the identification module identifies a new unknown file on the computing device;
the analysis module performs a new analysis of the new unknown file by applying, to the new unknown file, the machine-learning heuristic that employs the decision tree;
the classification module classifies the new unknown file as malicious based on the new analysis by the machine-learning heuristic;
after classifying the new unknown file as malicious, the sub-classification module uses the same decision tree employed by the machine-learning heuristic to incorrectly sub-classify the unknown file as the particular type of malicious file; and
the sub-classification module successfully performs the security action on the new unknown file in response to classifying the new unknown file as malicious and despite incorrectly sub-classifying the new unknown file as the particular type of malicious file.

15. A non-transitory computer-readable medium comprising one or more computer-readable instructions that, when executed by at least one processor of a computing device, cause the computing device to:
identify an unknown file on the computing device;
perform an analysis of the unknown file by applying, to the unknown file, a machine-learning heuristic that employs at least one decision tree;

classify the unknown file as malicious based on the analysis by the machine-learning heuristic; and after classifying the unknown file as malicious, using the same decision tree employed by the machine-learning heuristic to sub-classify the unknown file by:
- identifying at least one leaf node of the decision tree arrived at by the analysis performed by the machine-learning heuristic on the unknown file;
- determining that the leaf node of the decision tree is associated with a particular type of malicious file;
- sub-classifying the unknown file as not being the particular type of malicious file;
- adjusting a sensitivity of the machine-learning heuristic associated with sub-classifying files based on a confidence level, wherein adjusting the sensitivity comprises:
  - determining that one or more additional files on the computing device have been inaccurately classified by the machine-learning heuristic; and
  - decreasing the sensitivity of the machine-learning heuristic so that only files having a confidence level above a threshold are sub-classified by the machine-learning heuristic; and
- sub-classifying the unknown file as the particular type of malicious file in response to adjusting the sensitivity; and performing a security action in response to the unknown file having been sub-classified by the machine-learning heuristic as the particular type of malicious file, the security action being correlated to the particular type of malicious file and protecting the computing device from harm by removing the particular type of malicious file.

16. The non-transitory computer-readable medium of claim 15, wherein the one or more computer-readable instructions cause the computing device to:
  select, from a list of security actions, the security action that is correlated to the particular type of malicious file.

17. The non-transitory computer-readable medium of claim 15, wherein the one or more computer-readable instructions cause the computing device to notify a user of the computing device about the particular type of malicious file having been found on the computing device.

18. The non-transitory computer-readable medium of claim 15, wherein the one or more computer-readable instructions cause the computing device to use the same decision tree employed by the machine-learning heuristic to sub-classify the unknown file by:
  - identifying a plurality of leaf nodes of the decision tree arrived at by the analysis performed by the machine-learning heuristic, wherein each leaf node is associated with one or more particular types of malicious file;
  - determining that a predetermined percentage of the plurality of leaf nodes are associated with the particular type of malicious file; and
  - sub-classifying the unknown file as the particular type of malicious file based on the predetermined percentage of the plurality of leaf nodes being associated with the particular type of malicious file.

19. The non-transitory computer-readable medium of claim 15, wherein the one or more computer-readable instructions cause the computing device to use the same decision tree employed by the machine-learning heuristic to sub-classify the unknown file by:
  - identifying a plurality of leaf nodes of the decision tree arrived at by the analysis performed by the machine-learning heuristic, wherein each leaf node comprises a percentage for the particular type of malicious file;
  - calculating a sum by adding the percentage from each leaf node; and
  - sub-classifying the unknown file as the particular type of malicious file based on the sum of the percentages from the plurality of leaf nodes.

20. The non-transitory computer-readable medium of claim 15, wherein the one or more computer-readable instructions cause the computing device to use the same decision tree employed by the machine-learning heuristic to sub-classify the unknown file without performing additional analysis of the decision tree by the machine-learning heuristic.

* * * * *